Sept. 10, 1935. L. S. WILLIAMS 2,013,940
RECORDING SCALE
Filed Sept. 15, 1934 5 Sheets-Sheet 1
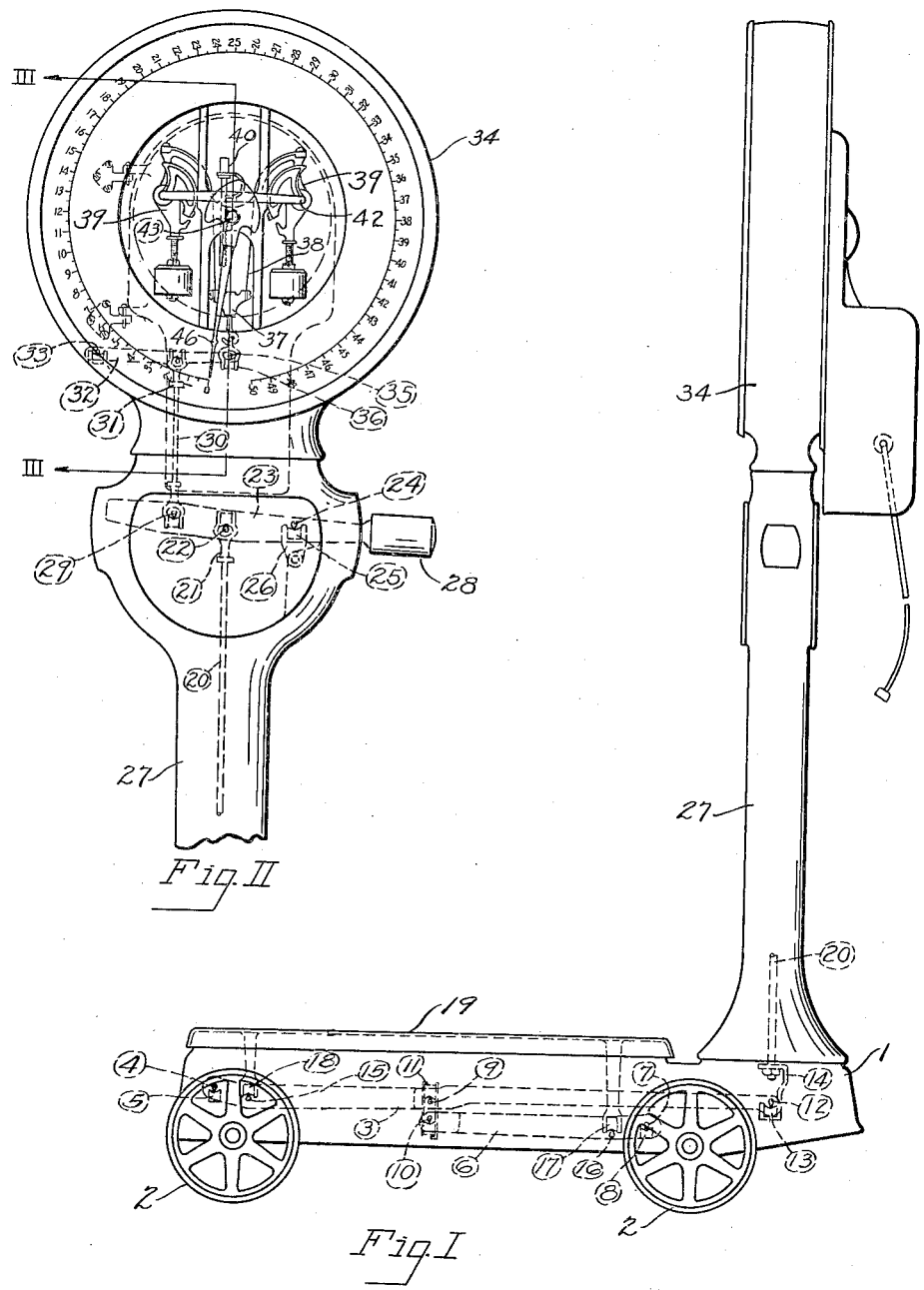
Lawrence S. Williams
INVENTOR

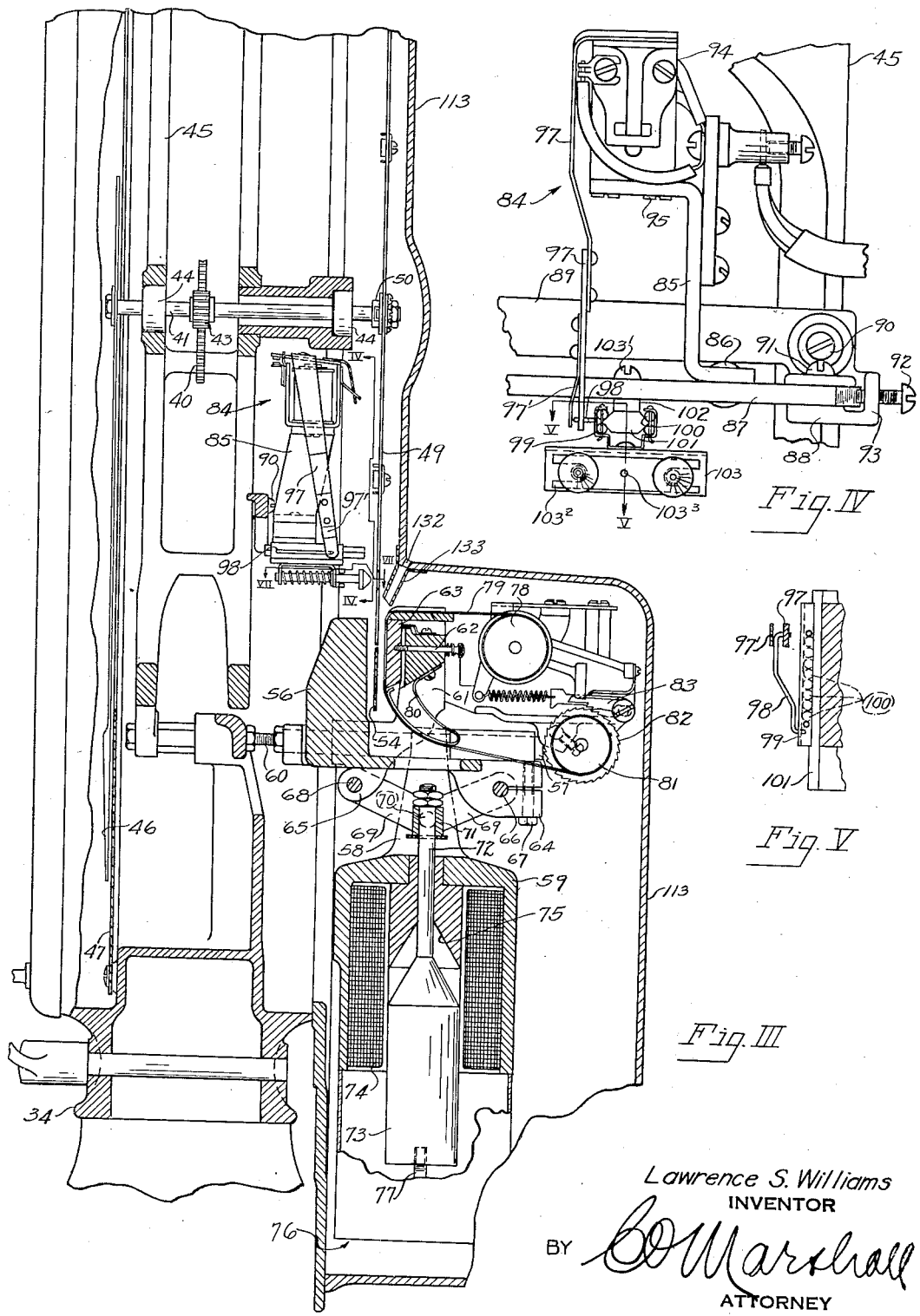
Fig. III
Fig. IV
Fig. V

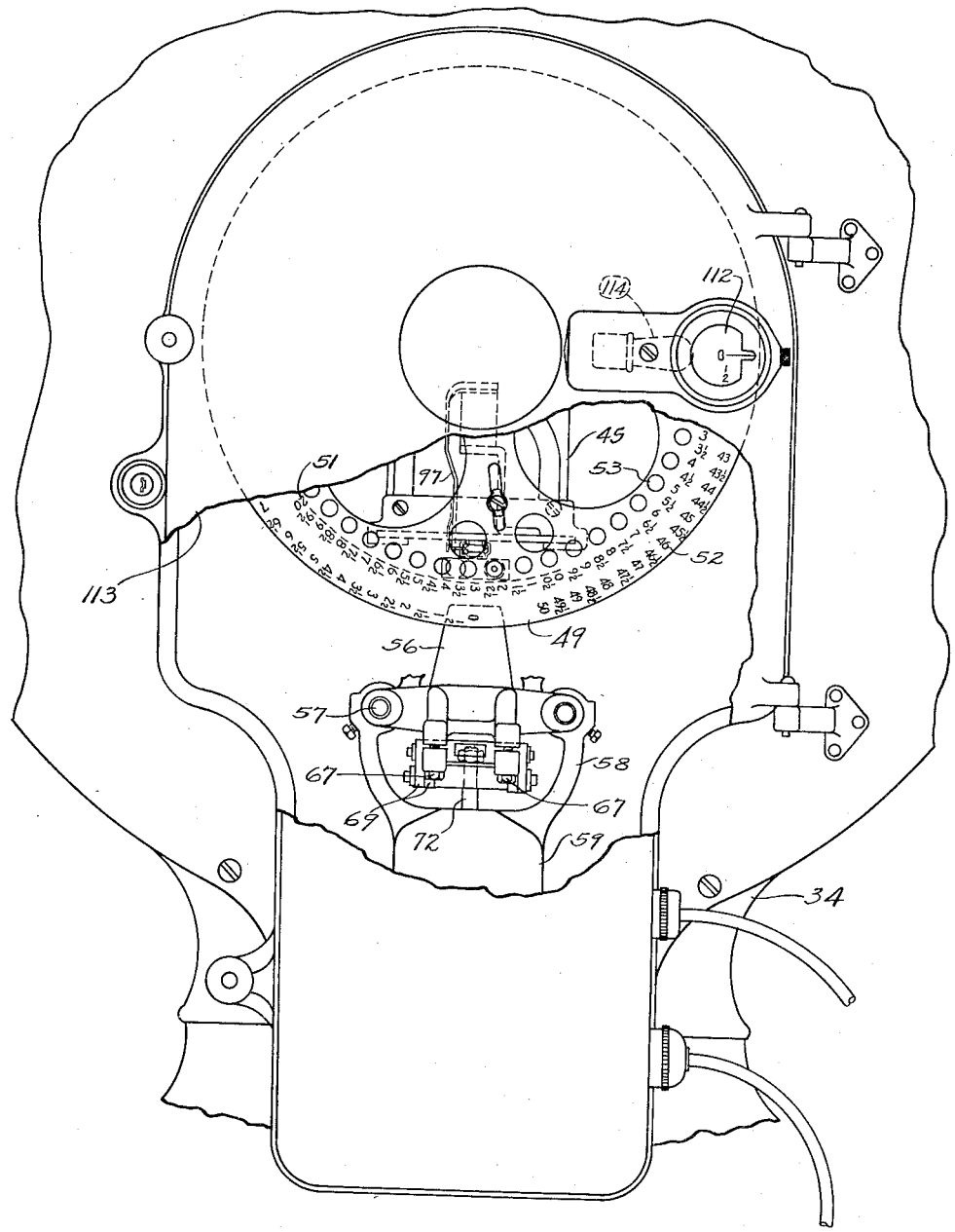
Fig. VI

Sept. 10, 1935.                L. S. WILLIAMS                2,013,940
                               RECORDING SCALE
                            Filed Sept. 15, 1934        5 Sheets-Sheet 4
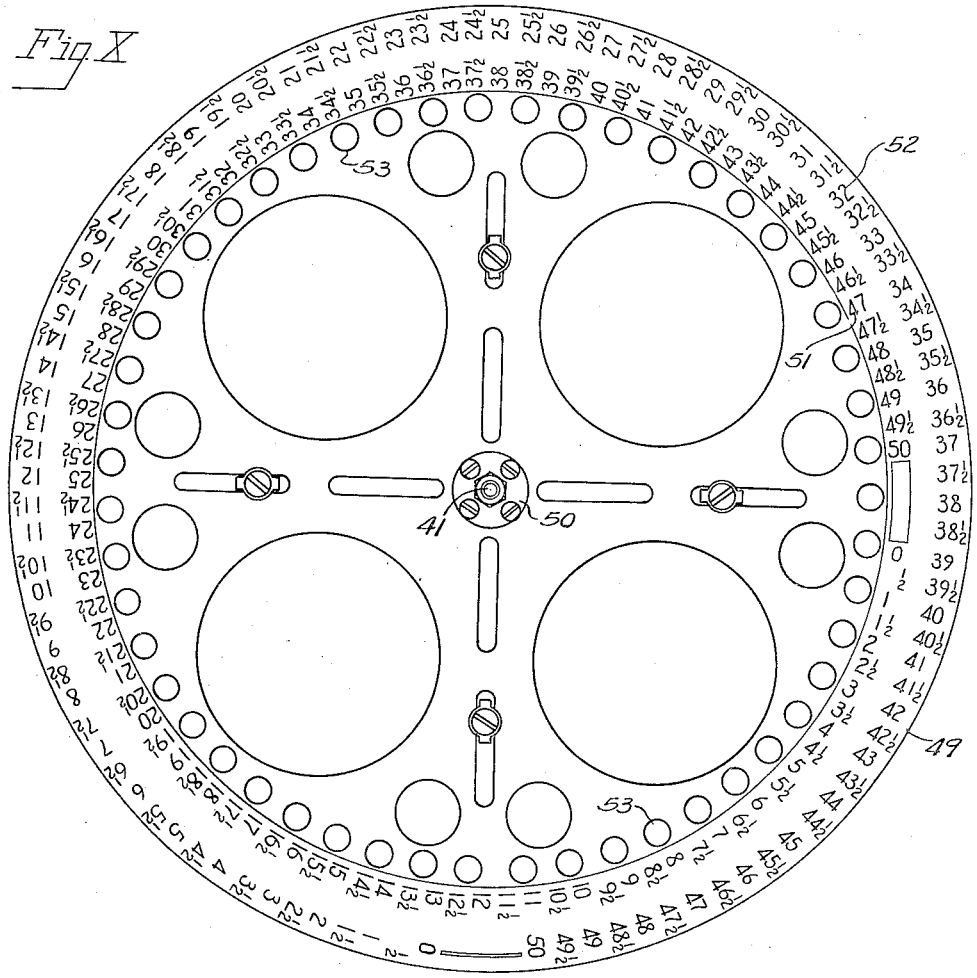
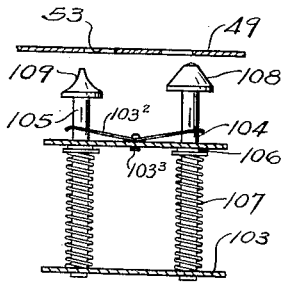
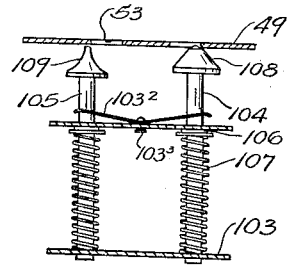
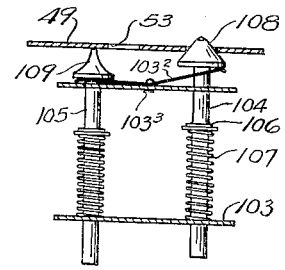
Fig. VII           Fig. VIII          Fig. IX
                              Lawrence S. Williams
                                   INVENTOR
                    BY     [signature] Marshall
                                   ATTORNEY

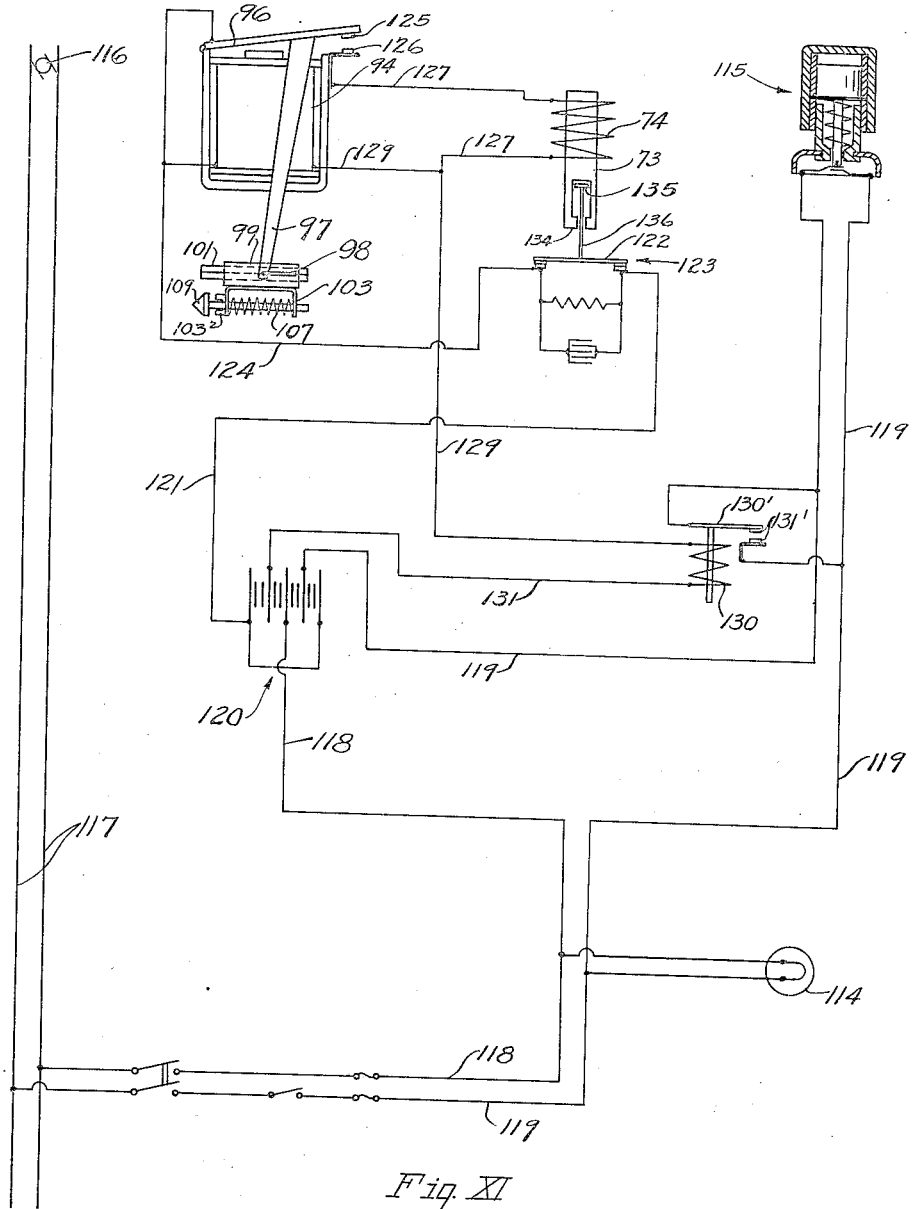
Fig. XI

Patented Sept. 10, 1935

2,013,940

UNITED STATES PATENT OFFICE 2,013,940

RECORDING SCALE

Lawrence S. Williams, Toledo, Ohio, assignor to Toledo Scale Manufacturing Company, Toledo, Ohio, a corporation of New Jersey Application September 15, 1934, Serial No. 744,226

9 Claims. (Cl. 265—5)

The invention relates generally to recording scales, and more particularly to recording scales provided with a type bearing member which is actuated by the weight of a load and having associated mechanism adapted to cooperate therewith, to print the weight in figures directly, distinguishing in this respect from my copending application, Serial No. 380,159, of which this application is a continuation in part.

The principal object of my invention is the provision of improved means for printing the weight of commodities by means of an indicium bearing disk directly in figures.

Another object is the provision of a selector mechanism synchronously actuated with imprinting means.

A still further object is the provision of improved means for invariably selecting the indicium on the type disk representing the nearest weight increment; and, A still further object is the provision of an improved electrical control circuit.

These, and other objects and advantages will be apparent from the following description in which reference is had to the accompanying drawings, wherein similar reference numerals designate similar parts throughout the several views.

In the drawings:—

Figure I is a side elevational view of a scale embodying my invention.

Figure II is a front elevational view of load counterbalancing and indicating mechanisms.

Figure III is an enlarged sectional fragmentary view, substantially along the line III—III of Figure II, showing the selector and imprinting mechanisms.

Figure IV is an enlarged fragmentary elevational view of a selector mechanism seen substantially from a position on the line IV—IV of Figure III.

Figure V is a fragmentary plan view of a slidable mounted pair of selecting plungers viewed substantially from a position on the line V—V of Figure IV.

Figure VI is a fragmentary elevational view of the back of the scale, a part being broken away to more clearly show parts of the selecting and imprinting mechanisms.

Figure VII is a sectional plan view substantially along the line VII—VII of Figure III showing the normal position of the sensing and selecting plungers.

Figure VIII is a sectional plan view of the same mechanism showing a step in the operation of the plungers in selecting the proper position of a type bearing member.

Figure IX is a similar view showing the parts in selected position at the time of imprinting.

Figure X is an elevational view of the type bearing member; and,

Figure XI is a diagram of the electrical circuit.

Since the weighing scale in which I have shown my improved printing device embodied is completely disclosed and described in U. S. Patent 1,543,768 to H. O. Hem and the imprinting means per se being substantially described and disclosed in my Patent 1,864,570 and my copending application, Serial No. 380,159, of which this application is a continuation in part I will describe these well known mechanisms only to such extent as is necessary to properly disclose the present invention.

Referring to the drawings in detail:—

A base 1, preferably a rigid iron casting, which for ease of transportation is mounted upon wheels 2, suitably supports and houses a load supporting lever system. This lever system comprises a long lever 3 oscillatably mounted with a fulcrum pivot 4 upon a bearing 5 which is fixedly held in the interior of the base 1. A short lever 6 is similarly supported with its fulcrum pivot 7 upon a bearing 8 and pivots 9 and 10 fixed in the levers 3 and 6 respectively are engaged by bearings of a stirrup 11. The end of the long lever 3 is equipped with a so called nose pivot 12 which engages a bearing 13 in a stirrup 14. In spaced relation to the fulcrum pivots 4 and 7 are load pivots 15 and 16. These load pivots 15 and 16 support bearings 17 and 18 fixed in depending legs of a platform 19, which is adapted to receive the loads to be weighed.

The stirrup 14, heretofore referred to, is loosely suspended from the lower end of a rod 20, the upper end of which is fastened into a stirrup 21 suspended from a load pivot 22 fixed in an intermediate lever 23 which is fulcrumed by means of a fulcrum pivot 24 on a bearing 25 stationed in a bracket 26 secured in the interior of a hollow column 27, which is mounted on an extension of the base 1. A portion of the intermediate lever 23 projects through an opening in the column 27 and has a loading box 28 fastened thereto which is made sufficiently heavy, with lead, to counterbalance the force on the rod 20 resulting from the dead weight of the lever system and platform. A power pivot 29, in spaced relation to the pivots 22 and 24, engages a bearing in the lower end of a connecting rod 30, the upper end of which engages a stirrup 31 in a pendulum operating lever 32. This lever is fulcrumed at 33 in the interior of a substantially watch case shaped housing 34 which surmounts the vertically extending column 27; the opposite end of this lever 32 is provided with a pivot 35 which engages a stirrup 36 suspended from an equalizer 37. This equalizer 37 by means of flexible metallic ribbons 38 transmits the force resulting from a load on a platform to the pendulums 39 which are of the so called "suspended" and "compensating" type.

When a load is placed on the platform 19 the force resulting from the weight thereof is transmitted, through the mechanism hereinbefore described, to the pendulums. These, due to this force, move upwardly and outwardly through an angle which is proportionate to the weight. A rack 40 which is pivotally secured to compensating bars 42, connecting the two pendulums 39, engages a pinion 43 seated on an indicator shaft 41 which is mounted in antifriction ball bearings 44, stationed in a skeleton-like sector guide 45 revolves an indicator 46 over a chart 47 fastened in one of the open faces of the housing 44 and cooperates to visually indicate the weight of the load in the well known manner.

To the opposite end of the shaft 41 a printing disk 49 of thin and light material is secured by means of a hub 50. This disk is provided with two series of raised weight indicia 51 and 52 which are etched thereon.

The series of figure characters 52 extending adjacent the periphery of the disk is adapted to print the weight of loads placed on the scale on a ticket or a record strip as desired. For a purpose, which will hereinafter become clear, a series of evenly spaced holes or perforations 53 are provided in the disk adjacent the inner row of characters 51. Directly beneath and in the plane of the disk 49 a plate 54 is stationed. This plate is made of material of the same thickness as the disk.

The mechanism, which is provided to perform the printing operation, comprises an abutment 56 slidably mounted on track or guide members 57 which are securely fastened to brackets 58 forming an integral part of a solenoid housing 59 and to a portion of the housing 34 by means of the studs 60. These track, or guide members 57 also movably support and guide a platen frame 61. Set into a recess of the platen frame 61, and retained by a screw 62, is a platen 63. The shape of the platen 63 and its mounting is such that its face may align itself to another surface.

Depending from the abutment 56 and the platen frame 62 are 4 short projections or arms 64 and 65 respectively. The two arms 64, which form an integral part of the abutment 56, are provided with apertures in which a shaft 66 is mounted and locked in this position by clamp screws 67. The two short arms 65 similarly support a shaft 68. Toggle links 69 pivotally engage the shafts 66 and 68 and also trunnions 70 of a horizontally extending crosshead 71 which is fixed, in this position, to an extension 72 of a solenoid armature 73 mounted for reciprocating movement within a solenoid coil 74, stationed in the interior of the previously referred to solenoid housing 59.

To limit the upward travel of the solenoid armature 73 an end stop 75 is affixed to the solenoid coil housing 59 in the interior of the coil. To the lower end of the core 73 a make and break switch mechanism 76 is connected by means of a rod 77. This make and break switch mechanism is shown schematically, in greater detail, in Figure XI.

Cooperating with the type disk 49 and the imprinting mechanism is an inking ribbon mechanism which may be of any desired design and construction and the mechanism shown in Figure III for this purpose is to be regarded illustrative only. A spool 78 under spring tension has wound thereon an inking ribbon 79 of usual form, the end of the ribbon is passed over the platen 63, parallel to the printing surface of the disk 49 and over a tension member 80 to a spool 81 which is provided with a flange 82 having notches which are adapted to be engaged by a pawl 83. During the operation of the printing mechanism this pawl 83 rotates the spool 81 an amount sufficient to present a new portion of the printing ribbon 79 to the printing disk upon each imprint. Since this mechanism forms no part of the invention a further and more detailed description is deemed unnecessary.

To position the printing disk 49 so that the character nearest to the actual weight of the commodity on the platform is positioned for printing, for example, if the actual weight of the commodity is 41 lbs. 9 oz., to position the disk so the 42½ lb., indicia, which is the nearest, is printed I provide a selector mechanism 84 which comprises a substantially Z shaped bracket 85 which is securely fastened by means of a rivet 86 to a horizontally disposed plate 87, preferably electrically insulated therefrom, which rests on shelf-like extensions 88 of a bracket 89 fastened by means of screws 90 to the vertically extending posts of the sector guide 45. The plate 87 is locked by means of the screws 91, and may be adjusted to the proper position by means of screws 92, which extend through upwardly bent ears 93 of the shelf-like extensions 88. The Z shaped bracket 85 has a magnet 94 fastened to its upper arm by means of the screws 95. This relay 94 (Figure XI) has a hinged armature 96 to which a downwardly extending arm 97 is fastened, the lower end of which is made of dielectric material so that the magnet 94 is insulated electrically from all other mechanism. A small aperture adjacent the lower end of the arm 97 engages the bent end of a steel wire clip 98 and a resilient thrust member 97¹ is riveted to the arm 97 to prevent this clip 98 from becoming disengaged (Figure V). The other bent end of this clip enters a small aperture in the side wall of a formed frame member 99 containing double rows of antifriction bearing balls 100 with which this frame-like member 99 is slidably mounted on obtuse knife edges extending horizontally from the edges of a hardened steel member 101, the knife edge extending between the two rows of balls. Spaced from the plate 87 by means of a rectangular block 102 and fastened to it by means of screws 103¹ the formed frame member 99 is riveted to a transversely extending substantially channel shaped member 103 provided with two pairs of spaced openings through which shanks of plungers 104 and 105 extend (Figure IX). These shanks are provided with annular abutments 106 which may be fastened thereto in any efficient manner so that a coil spring 107 surrounding the shanks and extending between the annular abutments and one of the downwardly projecting walls of the member 103 have normal bias to hold these plungers in the extended position shown in Figure VII.

For a purpose, which will hereinafter be more fully described, an equalizer 103² is loosely riveted at 103³ to the downwardly extending wall of the frame 103. The ends of this equalizer are bifurcated and the arms of the bifurcation embrace the shanks of the plungers.

The heads 108 and 109 of the plungers 104 and 105 respectively are each provided with a flat "land" on their tips. The head 108 slopes away from the "land" at approximately an angle of 120° for a short distance and for the remainder of the head at a slightly lesser angle forming a relatively blunt cone. In the plunger 105 the material of the head 109 is cut away slightly concave from the "land" to the shoulder and forms a relatively sharp cone. These plungers are spaced in the formed member 103 so that when one of the plungers is centered in one of the evenly spaced apertures 53 in the chart 49 the other plunger rests in the center of the bridge between two other holes 53. The normal position of the plunger 104 is such that its head 108 projects slightly beyond the head 109 of the plunger 105.

Since the operator of the device is usually stationed on that side of the scale on which the printing mechanism is attached which is opposite the one on which the indicator 46 cooperates with the chart 47 to show the weight, the series of weight characters 51 on the chart 49 is visible through an opening 112 (Figure VI) which is provided in a cover 113 adapted to enclose the printing mechanism. A lamp 114 is stationed above the chart adjacent the opening 112 and is energized from a source of electric current 116 to illuminate the chart and facilitate reading of the indicia.

When a load is placed on the platform 19 of the weighing device, intermediate mechanism hereinbefore described transmits the force resulting from the action of gravity thereon to the load counterbalancing pendulums 39. These move outwardly and upwardly until their combined moment counterbalances the moment of the load. The rack 40 pivoted to the counterbalancing bars 42, which move upwardly during this counterbalancing operation a distance proportional to the weight of the load, rotates the shaft 41 and the thereon mounted printing disk 49 through an angle which is also proportional to the weight of the load and thus positions the proper indicium of the series 52 on the printing disk 49 between the abutment 56 and the platen 63.

Pressure on a push button 115, which is of the transitory type, causes a pulse of alternating current to flow from a current source 116 through the wires 117 and 119, through the switch 115 to one of the alternating current poles of a rectifier 120 and through wire 118 to the other alternating current pole of this rectifier. Direct current flowing from the rectifier through the wire 131 to the coil of the magnet 130 causes its armature 130¹ to be drawn in and closing the contacts 131¹ thus maintaining the circuit when the transitory switch again opens. This current further travels through the wire 129 to one pole of the magnet 94. Current also flows from the rectifier 120 through the wire 121 through the contacts and bridge 122 of a make and break switch 123 to the other pole of the magnet 94. This energizes the coil of the magnet 94 and causes the armature 96 to be attracted and the arm 97 attached thereto moves the plunger frame 103 forward so that the plungers 104 and 105 center the chart 49. When the armature 96 has been attracted by the coil 94 contacts 125 and 126 are closed, thus energizing the coil 74 of the imprinting solenoid 59 causing the armature 73 to move upwardly and the links 69 attached to the crosshead 71 fastened to the upper end of the armature extension 72 to assume a horizontal position causing the abutment 56 and the platen 63 to move towards each other and impress the character on the chart positioned between them on a ticket or other document which was inserted through the slot 132 in the casing 113 and the guide 133 between the chart 49 and the ink ribbon 79 passing over the platen 63.

When the armature 73 has reached its uppermost position shoulders 134 forming a part thereof engage a head 135 on a switch stem 136 lifting the armature 122 of the switch 123 breaking the circuit and reestablishing the condition existing in the circuit before the push button was pressed.

One of the principal objects of this invention is the provision of means for centering the chart in such a manner that the indicium or character on the chart 49 in the series 52 representing the nearest increment of the weight of the load on the platform 19 is in position to be printed on such ticket. The two plungers 104 and 105 are so spaced in the frame 103 that when one will engage centrally in one of the number of equally spaced apertures 53 the other plunger will be positioned midway between two other of these apertures on the bridge of metal separating them. Hence, these plungers will position the chart in twice as many positions as there are such apertures. When either of the plungers 104 and 105, when moved forward, is nearly centered in the corresponding aperture in the chart the shape of the plunger will urge the chart into an exactly center position. However, either plunger may engage the edge of one of the apertures 53 and therefore one plunger has been arranged to lead the other by having it extend further through the frame 103 so that by the time the trailing plunger, in this case 105, is in position to select an aperture the leading plunger 104 has entered an aperture and has pulled the chart into alignment so that the trailing plunger 105 will stop on the bridge of metal between two successive apertures. In the event the leading plunger 104 rests upon the bridge of metal between two successive holes the trailing plunger 105 alone will enter the nearest aperture and urge the chart into position. Should there be a slight movement of the chart 49 when the plungers 104 and 105 are in operation it is possible that the leading plunger 104 may first contact a bridge between two successive apertures and due to the movement of the chart slide thereover and just enter the aperture at the exact instant the trailing plunger 105 also just enters one of the apertures 53. Without other provision this would prevent the chart 49 being centered. Since, however, the leading plunger has a relatively blunt conical head and the trailing plunger 105 a relatively sharp head the sharp conical head 105 has the power to overcome the influence of the blunter head of the plunger 104 and the blunt plunger will then yield and the sharp plunger will position the chart.

When the chart has been positioned in the manner hereinbefore described, the frame 103 is not yet in its outermost position, the arm 97 attached to the magnet 94 will impart a slight further movement. This will cause the shoulder of the head of the plunger, which has been centered in a hole, to contact the free end of the equalizer 103² and since this equalizer is pivotally fastened to the frame at 103³ it will rock about its fulcrum until the other end contacts the shoulder of the head of the other plunger in contact with the bridge between two apertures thus exerting additional force to hold the plunger, which has selected the proper aperture, more firmly in that position and overcoming all tendency resulting from the momentum of the chart from expelling the plunger from its position in the aperture; utilizing the full available power of the magnet 94.

It will be noted that the mechanism hereinbefore described and illustrated in the accompanying drawings fulfills the objects primarily stated. It is to be understood, however, that the invention is subject to variation, modification and change within the scope of the subjoined claims.

Having described my invention, I claim:

1. In a device of the class described in combination, weighing mechanism, a printing disc actuated by said weighing mechanism, imprinting means cooperating with said printing disc, a plurality of spaced apertures in said printing disc, a plurality of plungers adapted to enter said spaced apertures and means cooperating with said imprinting means and said plurality of plungers for selecting an aperture in said printing disc for one of said plungers to enter.

2. In a device of the class described, in combination, weighing mechanism, a printing chart actuated by said weighing mechanism, said chart having a plurality of evenly spaced openings, a plurality of plungers, adapted to selectively engage said openings, said plungers having blunt and sharply pointed heads.

3. In a device of the class described a rotatable chart having apertures adapted to be positioned according to the weight of an article, a positioning mechanism for said chart, said mechanism comprising a plurality of movable members and electro-magnetic means for moving all of said movable members into engagement with said chart and one of said movable members into one of said apertures in said chart.

4. In a device of the class described in combination weighing mechanism, a movable chart bearing a plurality of indicia and having a plurality of apertures, said chart being actuated by said weighing mechanism in proportion to the weight of a load, means for positioning one of said indicia in registration with a plane passing through said chart, said means comprising a plurality of spring pressed plungers, means for moving said plurality of plungers into engagement with said chart, one of said plungers being in advanced position and adapted to enter one of said apertures and influence the position of said chart if in substantial alignment therewith and another of said plungers being adapted to enter another of said apertures and influence the position of said chart when said first referred to plunger is not in substantial alignment with one of said apertures.

5. In a device of the class described in combination weighing mechanism, a movable chart bearing a plurality of indicia and having a plurality of apertures, said chart being actuated by said weighing mechanism in proportion to the weight of a load, means for positioning one of said indicia in registration with a plane passing through said chart said means comprising a plurality of spring pressed plungers, means for moving said plurality of plungers into engagement with said chart, one of said plungers being in advanced position and adapted to enter one of said apertures and influence the position of said chart in one direction if in substantial alignment therewith and another of said plungers being adapted to enter another of said apertures and influence the position of said chart in another direction when said first referred to plunger is not in substantial alignment with one of said apertures.

6. In a device of the class described in combination, a weighing scale, printing mechanism connected thereto, said weighing scale having a movable chart bearing weight indicia adapted to print an indicium representing the weight of a load, on said weighing scale on a record, said printing chart having a plurality of evenly spaced apertures, means for registering the indicium representing the nearest weight increment of the load in printing position; said means comprising a plurality of movable plungers, each of said plungers cooperating with a spring having a normal bias for holding said plungers in extended position, said plungers being adapted to cooperate with said apertures in said printing chart, the head of one of said plungers being a relatively blunt cone and positioned substantially in advance of the head of another of said movable plungers having a relatively sharp cone, said plunger having a relatively blunt head positioning said printing chart if in substantial alignment with an aperture in said printing chart, said other plunger having a relatively sharp head being adapted to overcome the bias of the spring of the other of said plungers if positioned so as to enter another of said apertures of said chart and position said chart when in substantial alignment with an aperture therein.

7. In a device of the class described in combination, weighing mechanism, printing mechanism connected thereto and adapted to cooperate therewith to print the weight of loads, said printing mechanism including a movable chart having a plurality of evenly spaced graduations and a plurality of evenly spaced apertures, and a plurality of spaced plungers adapted to cooperate with said evenly spaced apertures to locate said chart in printing position; the distance of said plungers being so that when one plunger is centered in one of said apertures the other of said plungers contact the surface of said chart separating two of the other of said plurality of apertures.

8. In a device of the class described a rotatable chart having apertures adapted to be positioned according to the weight of an article, a positioning mechanism for said chart, said mechanism comprising a plurality of movable members, an electro-magnetic means for moving all of said movable members into engagement with said chart and one of said movable members into one of said apertures in said chart and a member exerting pressure to hold said movable member in said aperture.

9. In a device of the class described in combination, a weighing scale, printing mechanism connected thereto, said weighing scale having a movable chart bearing weight indicia adapted to print an indicium representing the weight of a load, on said weighing scale on a record, said printing chart having a plurality of evenly spaced apertures, means for registering the indicium representing the nearest weight increment of the load in printing position; said means comprising a plurality of movable plungers, each of said plungers cooperating with a spring having a normal bias for holding said plungers in extended position, said plungers being adapted to cooperate with said apertures in said printing chart, the head of one of said plungers being a relatively blunt cone and positioned substantially in advance of the head of another of said movable plungers having a relatively sharp cone, said plunger having a relatively blunt head positioning said printing chart if in substantial alignment with an aperture in said printing chart, said other plunger having a relatively sharp head being adapted to overcome the bias of the spring of the other of said plungers if positioned so as to enter another of said apertures of said chart and position said chart when in substantial alignment with an aperture therein and a pivoted member cooperating with said plungers for adding additional pressure to the centering plunger.

LAWRENCE S. WILLIAMS.